F. E. VOORHIES.
COTTON SEED LINTING MACHINE.
APPLICATION FILED FEB. 20, 1919.
1,353,295.
Patented Sept. 21, 1920.
2 SHEETS—SHEET 1.
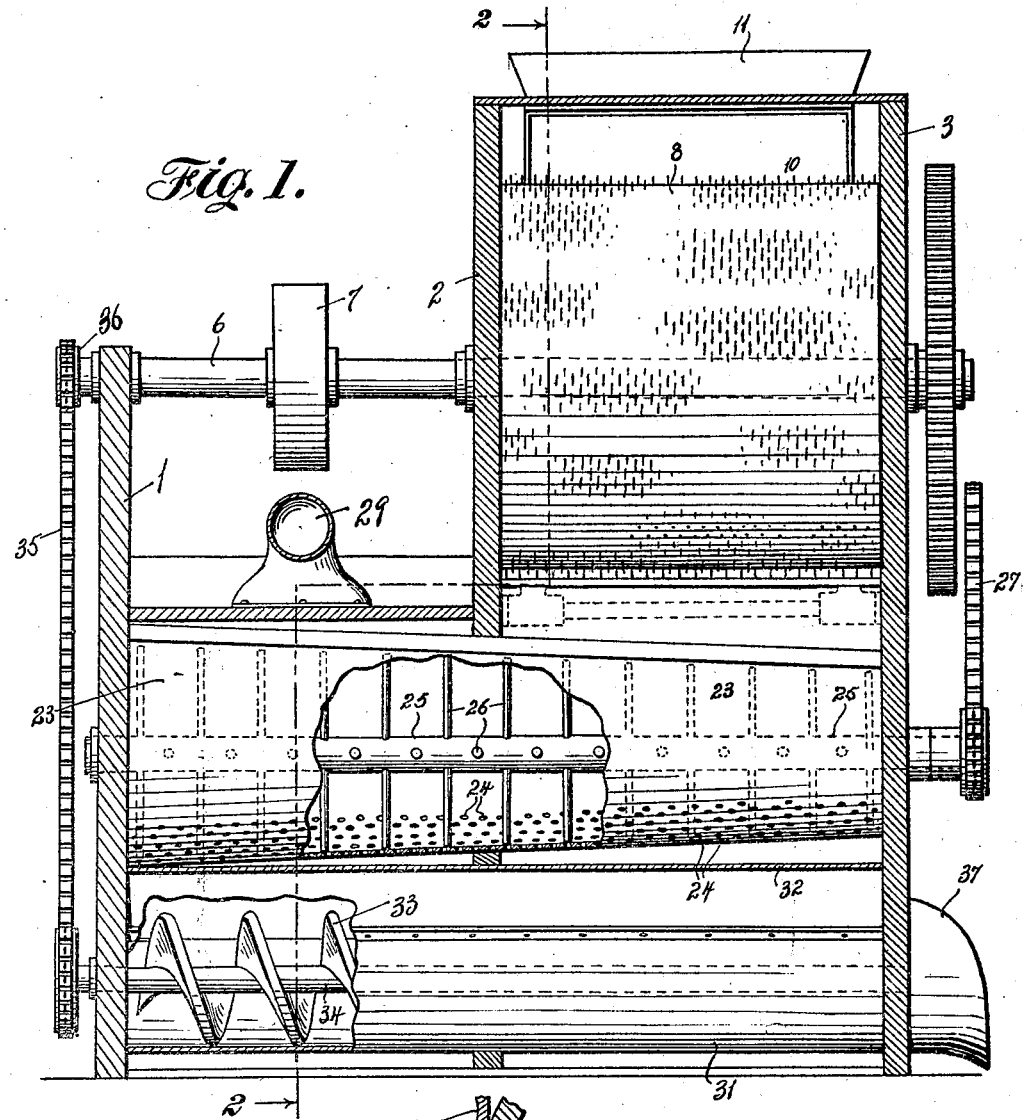
Fig. 1.
Fig. 5.
Fig. 4.
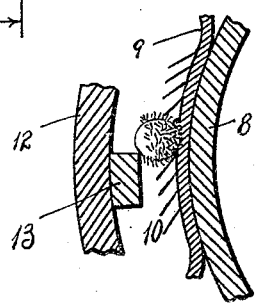
Fig. 6.
INVENTOR.
Felix E. Voorhies.
BY J. C. Ledbetter
ATTORNEY

F. E. VOORHIES.
COTTON SEED LINTING MACHINE.
APPLICATION FILED FEB. 20, 1919.

1,353,295.

Patented Sept. 21, 1920.

INVENTOR
Felix E. Voorhies.
ATTORNEY

UNITED STATES PATENT OFFICE.

FELIX E. VOORHIES, OF DALLAS, TEXAS.

COTTON-SEED-LINTING MACHINE.

1,353,295.  Specification of Letters Patent.  Patented Sept. 21, 1920.

Application filed February 20, 1919. Serial No. 278,172.

*To whom it may concern:*

Be it known that I, FELIX E. VOORHIES, a citizen of the United States, residing at Dallas, in the county of Dallas and State of Texas, have invented certain new and useful Improvements in Cotton-Seed-Linting Machines, of which the following is a specification.

This invention relates to a new and usefully improved form of cotton seed linting machines. The present invention discloses a design of machine which will thoroughly and effectively strip and clean the cotton lint and fiber from the seed and leave the hull bare and slick.

A broad purpose of the invention is to provide a cotton seed linting machine of such convenient size and simplicity of design as will render it usable in connection with oil mills and gin plants. The machine may be installed in the plant and receive its power from the same motive power as the gin stands or oil mill machinery themselves are driven. This will make it possible for cotton raisers to have their cotton seed linted at the same time the cotton is ginned. This machine will be very economical of power, requiring a minimum motive power for its operation.

Another purpose of the invention is to provide a machine comprising a linter element in combination with a separator element. The cotton seed are passed through the machine and the cotton and fiber removed therefrom, and during the same operation the separation of the fiber or lint mass from the seed is completed. It is a further purpose to provide a design of machine which will have a rotary linter and a rotary separator; the machine being substantial in construction and simple in operation and unlikely to get out of working order.

With the above and other objects in view the invention has relation to a certain combination and arrangement of parts an example of which is described in the following specification, pointed out in the append claims, and illustrated in the accompanying drawings, wherein;

Figure 1 illustrates a vertical sectional view of the cotton seed linter machine taken upon the lines 1—1 of the drawings.

Fig. 4 shows a detail view of the cotton seed passing between and through the linter elements of the machine.

Fig. 5 shows a view of a cotton seed after it has been linted, or the fiber and lint removed therefrom.

Fig. 6 shows a cotton seed in its normal condition after having passed through the gin and shows the fiber and lint still clinging to the shell of the seed.

Figure 2:
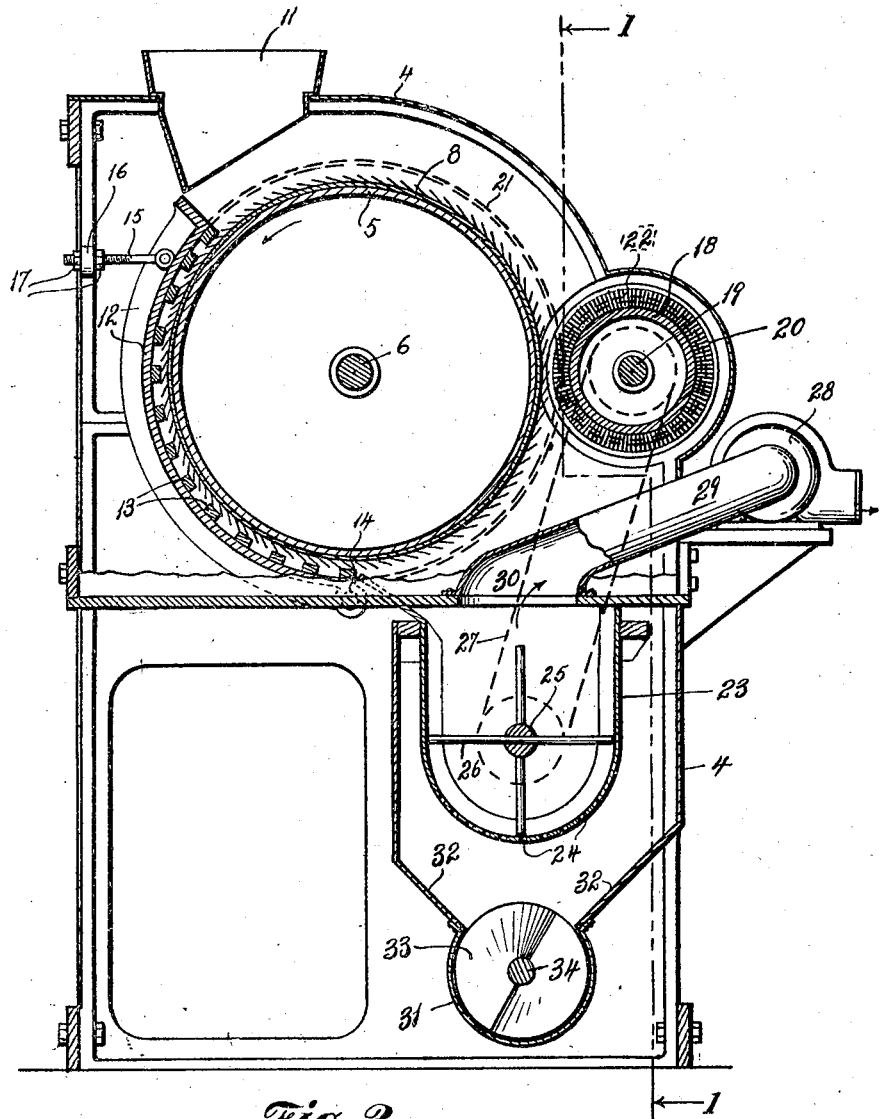
Fig. 2 illustrates a vertical sectional view taken transversely of the operating parts, the said section being taken upon the line 2—2.
Figure 3:
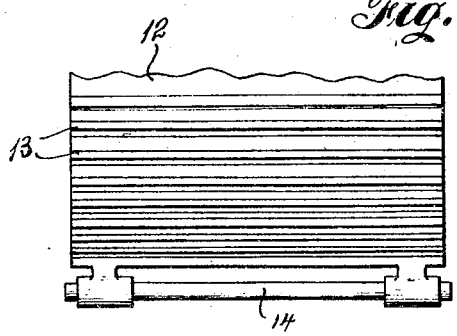
Fig. 3 is a partial front view of a certain linter breast used in the machine.
Figure 7:
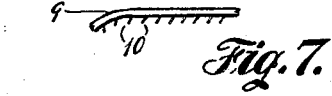
Fig. 7 shows a detailed view of the piece of carder cloth used in the machine.

Referring now more in particular to the drawings, wherein the same parts throughout the several views are designated by identical reference characters, the numerals 1, 2, and 3 illustrate the frame portions of the machine. The front portion of the machine is inclosed by a sheet metal casing 4 as illustrated. Within the upper portion of the machine is journaled a radial linter drum 5 carried on a shaft 6 which is driven from any suitable source of motive power by a pulley 7. The linter drum comprises cylindrical drum 5 about which is wrapped carder cloth 8. This carder element is illustrated in Fig. 7 and comprises a very strong and substantial flexible material such as heavy cloth or leather 9 with steel points or teeth 10 inserted therein and projecting through the surface of the cloth. This carder cloth is secured to the drum in any convenient manner, and will preferably have the carder teeth or points 10 inclined slightly forward or ahead of the direction of motion as indicated by the arrow on the drawing. This linter drum fits closely in the upper portion of the frame and extends in length from the frame 2 over to frame 3. A close running fit will necessarily exist between the ends of the linter cylinder and frame pieces so that cotton seed will not trickle down the ends of the cylinder and miss the linter operation. A cotton seed receptacle spout 11 is placed above the linter drum. Cotton seed will be fed through this spout and pass down upon the revolving drum. A linter breast 12 is mounted in close adjustable relation to the linter drum. This breast comprises a frame piece 12 having its inner working face concentric with the linter drum. Stripper bars 13 are fixed upon the linter breast. These bars are preferably formed of steel or other suitable material machined or shaped down until the corners thereof are perfectly square and sharp as shown in the drawings. The bars are spaced apart upon the breast and remain in stationary position and nearly engaging the moving points of the revolving carder. This breast is supported at its lower extremity upon a shaft 14. A screw threaded arm 15 has pivotal connection with the breast and passes through a lug 16 formed on the frame. An adjusting nut 17 makes it possible to move the breast in closer or more distant relation with the carder linter. After some use and experience with this machine the operator will learn the most effective adjustment of the breast and lock it in that position by tightening up the adjusting nuts.

A picker drum 18 is carried upon a shaft 19 and journaled in the frame just forward of the linter drum. This member comprises a drum 18 fitted with carder cloth 20 in a similar manner to the construction of the linter drum. The carder cloth on the picker drum however will have carder points or teeth somewhat longer than those shown on the linter, and these carder points will preferably project radially from the drum as differentiated from an angular position therewith as shown on the carder or linter drum. The carder drum and picker drum will be journaled in a relatively close position, and just close enough for the two parts to clear. This last described element revolves in the direction shown by the arrow. A gear 21 is fixed upon shaft 6 and gear 22 is fixed upon shaft 19. These gears intermesh and drive the picker drum at a higher speed than the linter drum 5 is driven.

A separator hopper 23 is arranged beneath the above described elements and adapted to receive the linted cotton seed as they flow from the linter drum. This separator comprises a sheet metal receiving hopper which extends from the frame 1 to frame 2 and is supported therebetween. The hopper is perforated with a great number of small openings 24 formed in the lower portion thereof. This member will preferably have a conical shaped construction as illustrated in Fig. 1 so that the seed will have a tendency to move from the upper portion of the hopper to the lower portion of the hopper as they fall from the linter drum. A shaft 25 fitted with a plurality of radial arms 26 is journaled within the hopper. These arms move in close engagement with the hopper continuously stirring and agitating the seed therein causing them to pass through the perforations. This agitator is journaled in the hopper in appropriate bearing and may be driven from the shaft 19 through the pulley 27 chain or other suitable means.

A centrifugal exhauster fan 28 is mounted in any convenient position upon or adjacent to the machine and driven from off some power shafts of this machine or from any other source. The exhauster fan connects with an air conduit 29 which extends through the casing of the machine. This conduit flares out as shown at 30 and opens directly above the agitator and receiving hopper. When the fan is in operation a suction will be created therethrough in the direction shown by the arrows. This suction will be regulated so that it will be sufficiently great to gather in the lint and fiber but will not pick up the seed.

A screw conveyer is used to dispose of the cotton seed which passes through this machine. This conveyer is mounted directly beneath the receiving hopper and comprises an inclosed cylindrical casing 31 the top portion of which is open. A casing 32 extends up and guides cotton seed into the conveyer chamber as the seed falls through the perforations. The screw conveyer 33 is carried upon the shaft 34 which is journaled in the frame of the machine and driven by appropriate means such as a belt or chain 35 passing over a pulley or sprocket 36 carried upon the shaft 6. This conveyer may have an open spout 37 out of which the seed will pour during the operation of the machine.

The drawings illustrating this invention are designed to disclose the operative principles of the invention. In the manufacture of this machine certain modifications in form and material may be employed without departing from the spirit of the invention. Roller or ball bearings will preferably be used on high speed rotating parts, and silent chain may well be employed in transmitting power from one shaft to another.

In the operation of this machine power may be transmitted to the main shaft which in turn drives all the elements as above described. The seed to be linted will be fed through the hopper 11 in regulated quantities and trickle downwardly through the revolving linter passing between the stripper bars and the carder points. Fig. 4 illustrates a seed being acted upon by the two elements of the linter system. The seed is being forced in close engagement with the sharp edge of the stripper bars and revolved and tumbled thereupon through the forceful action of the carder points which take hold of the fiber of the seed and revolve it over and over many times until it has passed through and under a continued action of tumbling and moving and frictional engagement with and upon the cutting edges of the stripper bars. The seed and lint will move together toward the lower portion of the carder drum and finally be discharged therefrom into the agitating or separator chamber. The seed will gravitate to the bottom of the chamber, while the lint will be drawn along the upper portions thereof and will find its way out through the exhaust conduit 29. The seed will be agitated and stirred until they have passed through the perforations of the chamber into the conveyer where they will be finally disposed of from the machine a thoroughly linted cotton seed.

When the seed tumble from the high speed radial linter into the hopper 23 it is possible that some small portions of lint or threads of fiber may become engaged with the seed and gravitate therewith to the hopper and not be immediately acted upon and carried off by the suction means. In this case the violent stirring action of the agitator will permit the suction to act upon the fiber and draw it out of the seed mass in the bottom of the hopper. The centrifugal action of the linter drum will throw the seed and lint therefrom as the drum emerges from the stripper breast. But when the machine is working to full capacity some small portions of cotton or seed may become attached to the carder points and tend to revolve continuously therewith unless removed. The function of the picker drum 18 is to remove any lint or seed which may have become attached to the linter drum. As the attached lint or seed pass the picker drum it will be removed therefrom by said picker drum and thrown off by centrifugal action back into the hopper. The higher peripheral velocity of the picker will insure the effective removal of the seed and lint therefrom.

As previously mentioned the stripper breast will be adjustably related to the linter drum. This adjustment of the relative position of the two members can be made use of when the machine is working either at low or high capacity to get most effective results. The stripper bars will preferably be secured to the face of the breast by counter-sunk screws or other appropriate means. They may be removed therefrom for sharpening or changing of position, but this latter probability is unlikely in this form of linter.

The cotton seed linter disclosed within these Letters Patent will not be bulky in size or complicated in construction, and for that reason it is adapted to installation and use in gin plants and oil mills and can be managed and operated by those ordinarily skilled in the art of ginnery.

The invention is presented to include any such changes in design, form or operation, as may come within the scope of the following claims.

Claims:

1. A cotton seed linting machine comprising a linter drum, a stripper breast mounted adjacent the linter drum, a plurality of stripper bars carried on the stripper breast and slightly spaced from the linter drum, adjustable means employed for varying the position of the stripper breast in relation with the linter drum, a picker drum for cleaning the seed and lint from the linter drum, a perforated cotton seed receiving hopper to catch the linted seed thrown from the linter drum and from the picker drum, an agitator within the hopper, suction means employed to remove the lint from the hopper, and a seed conveyer to receive the linted seed which comes from the hopper and to dispose of same from the machine.

2. A cotton seed linting machine comprising; a linter element consisting of a drum, carder points on the drum, a picker drum, carder points on the picker drum somewhat longer than the points on the linter drum and working in close relation to the linter drum, a perforated receiving hopper to catch the linted seed, a rotating agitator in the receiving hopper, suction means for removing the lint from the hopper, and means for discharging the linted seed from the machine.

3. A cotton seed linting machine of the type employing revolving cylinders having teeth for working against the cotton seed, and characterized by having a plurality of sharp-cornered bars disposed in stationary position about the periphery of the cylinders for scraping and cutting lint from the seed tumbled and worked by the cylinders.

4. A cotton-seed linting machine comprising; a casing, a carder drum mounted in the casing having points to card against the seed, a stationary device mounted adjacent the carder drum to resist the movement of the seed to effect the stripping of the lint therefrom, a plate horizontally disposed underneath the drum dividing the casing, said plate provided with an opening through which the cotton seed and lint fall, a receiving hopper placed beneath the plate and under the opening to catch the seed and lint, an agitator within the receiving hopper to agitate the seed and lint, said plate having an opening directly above the receiving hopper and agitator, a lint-carrying conduit connected with the opening above the receiving hopper and agitator, and a suction fan connected with the conduit to create a draft to draw away the lint from the receiving hopper.

5. A cotton-seed linting machine comprising; a casing, a carder drum mounted in the casing having points to card against the seed, a stationary device mounted adjacent the carder drum to resist the movement of the seed to effect the stripping of the lint therefrom, a plate horizontally disposed underneath the drum dividing the casing, said plate provided with an opening through which the cotton seed and lint fall, a receiving hopper placed beneath the plate and under the opening to catch the seed and lint, an agitator within the receiving hopper to agitate the seed and lint, said plate having an opening directly above the receiving hopper and agitator, a lint-carrying conduit connected with the opening above the receiving hopper and agitator, a suction fan connected with the conduit to create a draft to draw away the lint from the receiving hopper, said receiving hopper provided with perforations therein through which the lint and seed fall, and a conveyer underneath the perforated receiving hopper to catch the falling seed and carry them from the machine.

6. A cotton-seed linting machine comprising; a casing, a carder drum mounted in the casing having points to card against the seed, a stationary device mounted adjacent the carder drum to resist the movement of the seed to effect the stripping of the lint therefrom, a plate horizontally disposed underneath the drum dividing the casing, said plate provided with an opening through which the cotton seed and lint fall, a receiving hopper placed beneath the plate and under the opening to catch the seed and lint, an agitator within the receiving hopper to agitate the seed and lint, said plate having an opening directly above the receiving hopper and agitator, a lint-carrying conduit connected with the opening above the receiving hopper and agitator, and a suction fan connected with the conduit to create a draft to draw away the lint from the receiving hopper, said stationary device provided with sharpened projections for scraping and cutting against the seed as they are forcibly moved over the device by the carder drum.

7. A cotton-seed linting machine comprising; a casing, a carder drum having points rotatably confined in the casing, an arcuate frame spaced from the carder drum, a plurality of sharpened bars carried by the frame and spaced apart to effect a scraping and cutting action on seed rolled and tumbled against the bars by the points of the carder drum, a receiving hopper spaced beneath the carder drum and forward of the frame and bars, a plate reaching from the receiving hopper up to the first bar on the frame to catch and guide the seed and lint from the bars down into the receiving hopper, and means for effecting the separation of the lint and seed.

In testimony whereof I affix my signature.

FELIX E. VOORHIES.